US008349242B2

(12) United States Patent
Cox et al.

(10) Patent No.: US 8,349,242 B2
(45) Date of Patent: Jan. 8, 2013

(54) METHOD OF MOLDING REEL FLANGES AND TOOL ARRANGEMENT THEREOF

(75) Inventors: Gary L. Cox, Richmond, IN (US); Chad L. Eversole, Richmond, IN (US); Gerald H. Davis, Fountain City, IN (US)

(73) Assignee: Vandor Corporation, Richmond, IN (US)

( * ) Notice: Subject to any disclaimer, the term of this patent is extended or adjusted under 35 U.S.C. 154(b) by 0 days.

(21) Appl. No.: 12/380,104

(22) Filed: Feb. 23, 2009

(65) Prior Publication Data

US 2009/0273120 A1  Nov. 5, 2009

Related U.S. Application Data

(60) Provisional application No. 61/066,642, filed on Feb. 22, 2008.

(51) Int. Cl.
  *B29C 45/36* (2006.01)
  *B29C 45/10* (2006.01)

(52) U.S. Cl. ............... 264/328.1; 264/299; 425/190 R; 425/186

(58) Field of Classification Search ............ 425/183, 425/190, 542, 577, 190 R, 467–468; 264/328.1, 264/219, 328.2–328.9; 249/102, 103
See application file for complete search history.

(56) References Cited

U.S. PATENT DOCUMENTS

| | | | | |
|---|---|---|---|---|
| 3,799,724 A * | 3/1974 | Grady | | 425/311 |
| 4,384,702 A * | 5/1983 | Boskovic | | 249/103 |
| 4,433,592 A * | 2/1984 | Tatsumi et al. | | 74/570.2 |
| 5,200,366 A * | 4/1993 | Yamada et al. | | 29/841 |
| 5,282,733 A * | 2/1994 | Noritake et al. | | 425/183 |
| 5,980,809 A * | 11/1999 | Crain et al. | | 264/318 |
| 6,042,904 A * | 3/2000 | Greenblat et al. | | 428/13 |
| 6,942,476 B2 * | 9/2005 | Parmelee et al. | | 425/3 |
| 7,291,000 B2 * | 11/2007 | Ciccone et al. | | 425/192 R |
| 7,364,113 B2 * | 4/2008 | Ripplinger | | 242/610.6 |
| 7,762,802 B2 * | 7/2010 | Mai | | 425/190 |
| 8,016,584 B2 * | 9/2011 | Braungardt et al. | | 425/255 |
| 8,048,356 B2 * | 11/2011 | Chang | | 264/255 |
| 2004/0076703 A1 * | 4/2004 | Saulle | | 425/190 |
| 2004/0084807 A1 * | 5/2004 | Bischer et al. | | 264/328.7 |
| 2007/0215744 A1 * | 9/2007 | Sogabe | | 242/608.8 |
| 2008/0290248 A1 * | 11/2008 | Yang | | 249/103 |
| 2009/0050783 A1 * | 2/2009 | Roberts | | 249/155 |
| 2009/0250847 A1 * | 10/2009 | Burchardt et al. | | 264/511 |
| 2010/0033971 A1 * | 2/2010 | Lu et al. | | 362/294 |
| 2010/0086405 A1 * | 4/2010 | Higo et al. | | 416/189 |
| 2010/0117433 A1 * | 5/2010 | Cassaday | | 297/452.46 |
| 2010/0320646 A1 * | 12/2010 | Brown et al. | | 264/328.1 |

* cited by examiner

*Primary Examiner* — Joseph Del Sole
*Assistant Examiner* — Nahida Sultana
(74) *Attorney, Agent, or Firm* — Maginot, Moore & Beck

(57) ABSTRACT

A method of molding a flange uses a first tool element and a second opposing tool element. The first tool element defines a negative of at least a portion of a first side of a flange, and the second tool element defines a negative of at least a portion of the second side of the flange. The method includes providing a set of blocks for insertion into a plurality of recesses in the second tool element, the set of blocks insertable in a plurality of configurations, each configuration defining a negative of a set of retention features on the second side of the flange. The plurality of configurations define differing configurations of retention features on the second side. The method also includes inserting at least some blocks into the second tool element to form a selected one of the plurality of configurations, and performing injection molding using the first tool element and the second tool element.

17 Claims, 7 Drawing Sheets

METHOD OF MOLDING REEL FLANGES AND TOOL ARRANGEMENT THEREOF

This application claims the benefit of U.S. Provisional Patent Application Ser. No. 61/066,642, filed Feb. 22, 2008.

FIELD OF THE INVENTION

The present invention relates generally to reels for supporting and storing flexible media, such as cable, wire, rope, hose and the like.

BACKGROUND

Reels for supporting and storing flexible media come in many styles and sizes. In general, a typical reel includes two flanges and a core extending between the two flanges. The flexible media, which may suitably be wire, cable, rope, chain, hose or the like, is wound around the core and axially retained by the end flanges.

One common construction of reel consists of two flanges formed from molded plastic and a central core that is constructed of wood, metal, plastic, or paper. The flanges may be secured to the core using adhesives and/or fasteners, or may be secured to each other through the hollow core, with the core trapped between the two flanges. In the latter design, the flanges may be provided with a circular channel that is configured to receive the end of the core and hold the core in position. In this design, a long bolt secures the two flanges against the opposing ends of the core. A design of this type is disclosed in U.S. Pat. No. 5,897,075.

An advantage of plastic flanges is that they may readily be formed using injection molding techniques. The use of injection molding for preparing reel flanges provides the advantage of enabling the inclusion of convenience features that would be difficult or expensive to implement if the flange could not be injection molded. For example, injection molding makes it easier to include arbor holes, drive holes, and other features in a flange. U.S. Pat. No. 5,897,075 shows how features used to help align stacked reels may be easily included in a molded flange. Such flange stack features would be difficult to include in a wooden, paper or metal flange, which must be cut, assembled and/or stamped.

In addition, molded plastic reels exhibit a good strength-to-cost ratio. To this end, molded plastic flanges can be designed to include support ribs that allow for the overall flange width to be relatively thin while retaining strength via the ribs.

While plastic flanges have many advantages over their wood and metal counterparts, a drawback to the use of molded plastic reels is the cost associated with tooling. Tooling a plastic molded flange requires expertise and expense. A large percentage of the cost of a reel flange is associated with the recovery of the tooling cost. There is always a need, therefore, for reducing the cost of tooling for molded reels.

SUMMARY OF THE INVENTION

The above described drawback, as well as others, is addressed at least partially by one or more embodiments of the invention. One embodiment is a tool for use in molding a flange for use in a reel. The tool includes a first element and an opposing second element, wherein the first and second element substantially form a negative of the flange. The second element defines a negative of an inner surface of a flange, and includes a plurality of insert recesses. The insert recesses are configured to receive inserts such that the inserts define a negative of a core retention feature for the flange in a select one of a plurality of radial positions on the flange.

Another embodiment is a method of molding a flange using a first tool element and a second opposing tool element. The first tool element defines a negative of at least a portion of a first side of a flange, and the second tool element defines a negative of at least a portion of the second side of the flange. The method includes providing a set of blocks for insertion into a plurality of recesses in the second tool element, the set of blocks insertable in a plurality of configurations, each configuration defining a negative of a set of retention features on the second side of the flange. The plurality of configurations define differing configurations of retention features on the second side. The method also includes inserting at least some blocks into the second tool element to form a selected one of the plurality of configurations, and performing injection molding using the first tool element and the second tool element.

The features and advantages of these embodiments, as well as others, will become more readily apparent to those of ordinary skill in the art by reference to the following detailed description and accompanying drawings.

DETAILED DESCRIPTION

Figure 1A:
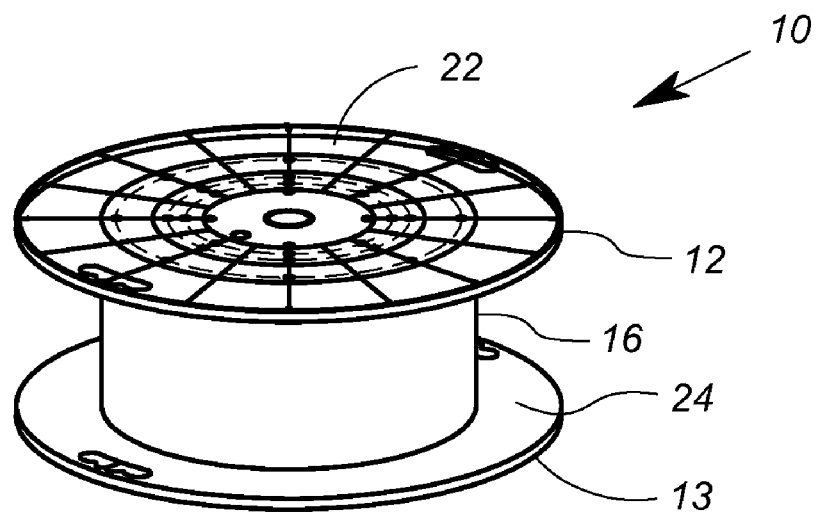
FIG. 1a shows a perspective view of an exemplary first reel that incorporates flanges manufactured according to a first embodiment of the invention.
Figure 1B:
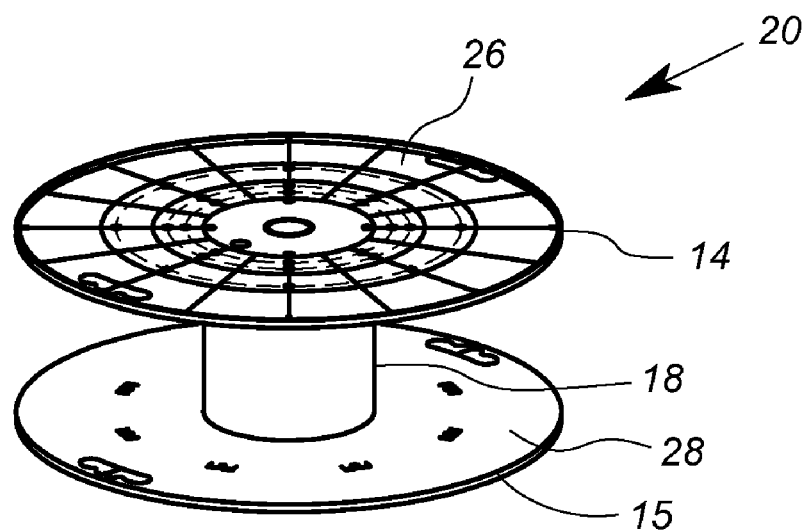
FIG. 1b shows a perspective view of an exemplary second reel that incorporates a second set of flanges manufactured according to a first embodiment of the invention.

FIGS. 1a and 1b illustrate a concept of a first embodiment of the invention. FIGS. 1a and 1b show two different reels 10 and 20 having different sized cores 16 and 18, and similar flanges 12, 13, 14 and 15. The cores 16 and 18 of this exemplary embodiment are hollow and generally cylindrical, and may suitably be constructed of paper. The cores 16 and 18 have different diameters, which may or may not be dictated by the application for which they are to be used. Because the cores 16 and 18 are hollow, they also define an inner diameter, which is slightly smaller than their outer diameter by two times the wall thickness.

Each of the flanges has a first or outer side that faces axially away from the cores 16 and 18, exemplified by the outer sides 22 and 26 of the flanges 12 and 14. Each of the flanges also includes a second or inner side, illustrated by the inner sides 24 and 28 of the flanges 13 and 15. The flanges 12, 13, 14 and 15 are largely identical, with the exception that the flanges 12 and 13 include features, not shown in FIG. 1a, on their inner sides that are positioned to engage the inner surface of the hollow core 16, while the flanges 14 and 15 include features on their inner sides that are positioned to engage the inner surface of the hollow core 18.

The flanges 12 and 13 are secured to the core 16 by any suitably method, including stapling, using adhesives, or using other types of fasteners. In some cases, the flanges 12 and 13 are fastened or glued to the core 16 directly. In other cases, the flanges 12 and 13 can be secured to each other using bolts, not shown. In such cases, the bolts extend from one flange 12 to the other flange 13 through the interior of the core 16. When the flanges 12 and 13 are fastened to each other in this method, the core 16 is trapped in between the flanges 12 and 13. In addition, the core 16 is retained radially at least in part by the core retaining features discussed above. In any event, several methods of fastening flanges to each other and/or to a core are well known.

Figure 2:
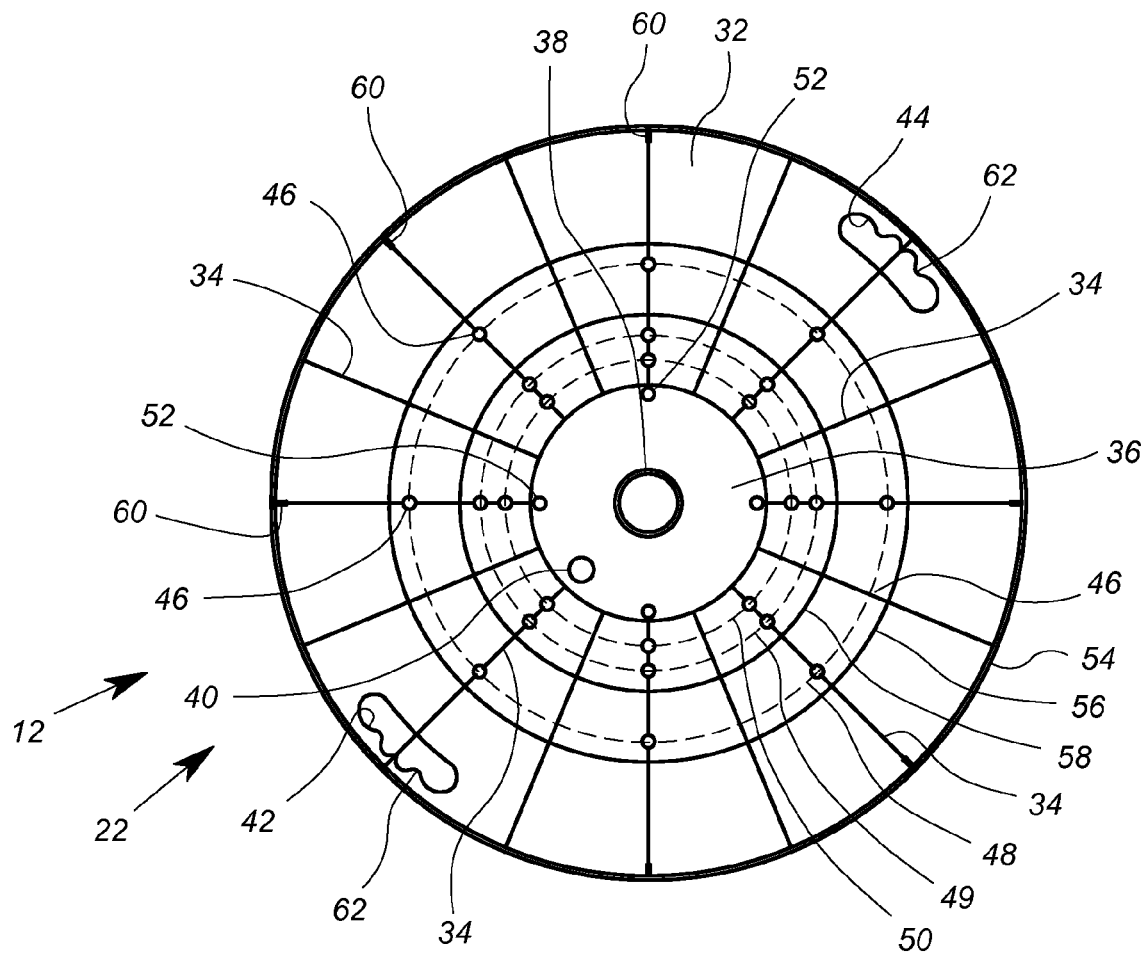
FIG. 2 shows a top plan view of a flange according to an embodiment of the invention.
Figure 3:
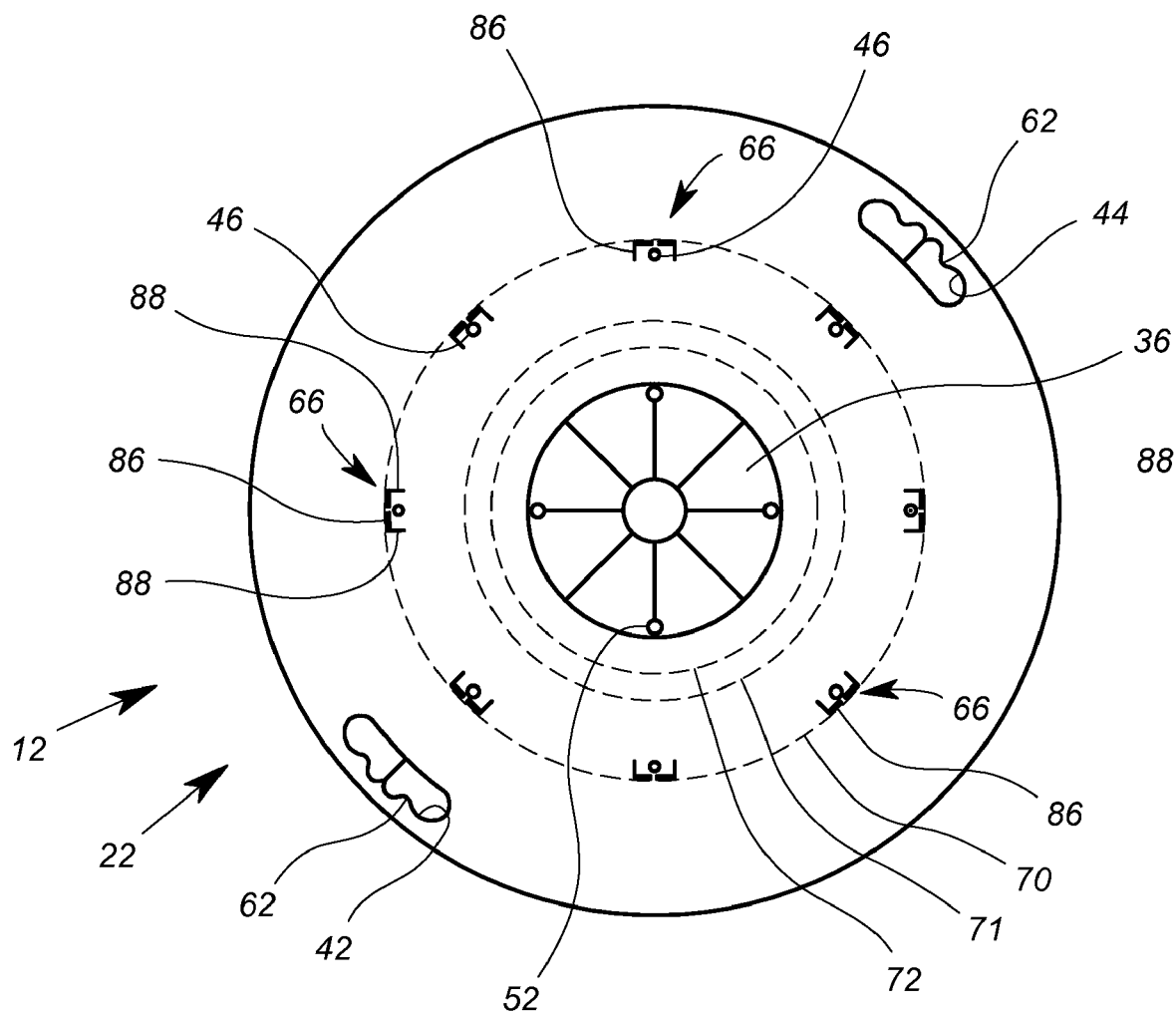
FIG. 3 shows a bottom plan view of the flange of FIG. 2.
Figure 4:
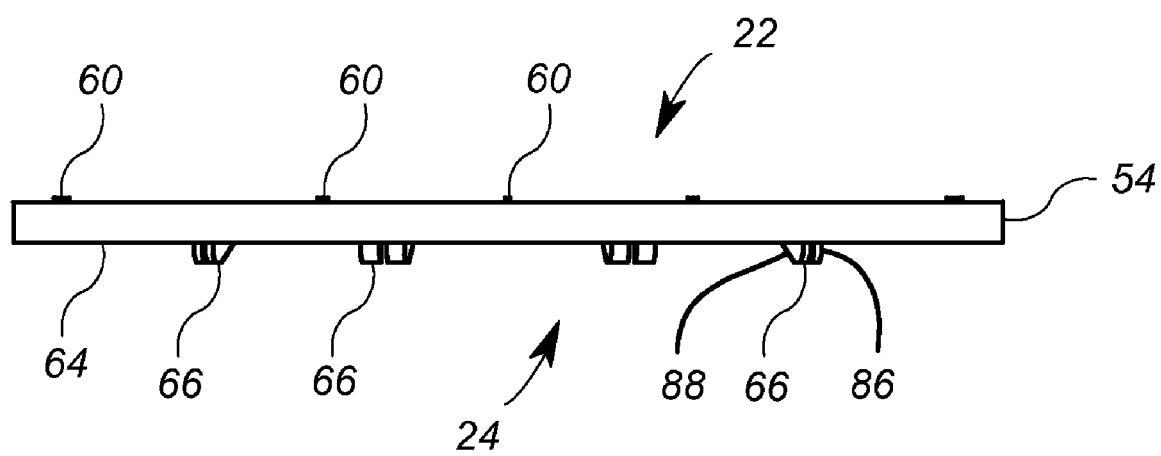
FIG. 4 shows a side plan view of the flange of FIG. 2.

Further detail regarding the core retaining features is provided in connection with the exemplary embodiment of the flange 12 shown in FIGS. 2, 3 and 4. In particular, FIG. 2 shows a top plan view of the flange 12, FIG. 3 shows a bottom plan view, and FIG. 4 shows a side plan view. Reference is made to all three figures in the discussion of the flange 12 below.

As shown primarily in FIG. 2, the first side 22 of the flange 12 includes a flange face 32, a plurality of radially extending ribs 34, a core area 36, an arbor hole 38, a drive hole 40, first and second handle holes 42, 44, a radial set of bolt holes 46, a set of inner bolt holes 52, an outer annular rim 54, and inner annular rims 56 and 58.

The flange face 32 constitutes one side of the main body of the flange 12 and is in the shape of an annulus. The core area 36 is a disc-shaped body in the center of the annulus of the flange face 32. The flange face 32 extends from the core area 36 radially outward in a concentric manner. The arbor hole 38 is a through-hole at the center of the core area 36, and thus is arranged about the axis of the flange 12. The arbor hole 38 is configured to receive an axial support from a fixture, not shown, that allows the reel 10 to rotate to wind or unwind a flexible media load. The drive hole 40 is defined in the core area 36 and is located off-center or eccentric to the central axis of the flange 12.

The core area 36 in this embodiment is axially raised from the main surface of the flange face 32. The outer annular rim 54 is also axially raised, and forms an upwardly extending annular ridge or rib that is disposed at the outermost radial edge of the flange face 32. Similarly, the inner annular rims 56, 58 constitute upwardly extending rims. However, the inner annular rims 56, 58 are at different radial distances from the core area 36, the distances lying between the position of the outer annular rim 54 and the core area 36. The radial ribs 34 are axially raised ribs that extend radially from the core area 36 to the outer annular rim 54. The radial ribs 34, the outer annular rim 54, and the inner annular rims 56, 58 all extend to substantially the same axial height from the flange face 32. In this embodiment, a number of rim extensions or posts 60 extend axially from the radial ribs 34 to a level slightly higher than the outer annular rim 54, and are located at a radial distance just short of the outer annular rim 54. These extensions 60 are located to engage the outer annular rim of another similar flange facing the opposite direction and stacked on top of the flange 12. The extensions 60 serve to facilitate stacking of reels by retaining another reel that has been stacked on the reel 10 in registration with the reel 10.

The handle holes 42, 44 are through-holes formed in opposing positions near the edge of the flange face 32. The handle holes 42, 44 are elongated in shape having an annular length sized to accommodate the width of four or five human fingers, and a radial width sized to accommodate the width of a little more than one finger. The handle holes preferably include positioning or comfort ridges 62 to help keep at least some fingers comfortably separated from each other when manipulating a heavy, loaded reel.

The radial set of bolt holes 46 is a set of holes configured to receive a bolt, not shown. The bolt is used to secure the flange 12 to the flange 13 when the core 16 is disposed between the two flanges 12 and 13. As discussed above, the bolt passes through the central opening of the core 16.

The flange 12 is generally configured to be molded for one of three different sizes of core. Accordingly, the set of bolt holes 46 is arranged at a select one of three radial positions indicated by the circumferences 48, 49 and 50. It will be appreciated that the circumferences 48, 49 and 50 represent only a reference position, and do not necessarily constitute actual physical feature of the flange 12. In this embodiment, the bolt holes 46 are arranged on the circumference that corresponds to the circumference of the core size that is intended to be used. Accordingly, on the flange 12, the bolt holes 46 are arranged on the circumference 48 because this exemplary embodiment is configured for a core (e.g. core 16) having a corresponding (but not necessarily equivalent) circumference. However, in the flange 14 of FIG. 1b, which is configured for the core 18, the bolt holes 46 would be arranged along the circumference 50, which corresponds to the circumference of the core 18. The position of the bolt holes 46 is variably configured through the use of various configurations of mold inserts, which will be discussed further below in connection with FIGS. 5 to 7. The radius of each of the circumferences 48, 49 and 50 is preferably arranged to be slightly smaller than the radius of the core with which the flange is intended to be used. FIG. 3 shows the possible core circumferences 70, 71 and 72, which correspond to the bolt hole circumferences 48, 49 and 50, respectively.

It is noted that, alternatively, a single set of bolt holes may be provided inside the innermost possible core, for example, at circumference 48. In such an embodiment, a single set of bolt holes is used regardless of the size core with which the flange is intended to be used. However, in the embodiment disclosed herein, the different radial bolt hole positions 48, 49 and 50 allows the bolts to be located at a substantially outermost radial position for each size core. Such a configuration allows for improved torque resistance when larger radius cores are employed.

Regardless, the inner bolt holes 52 are arranged in the core area 36 for all configurations and may be used additionally, or in the alternative.

As shown primarily in FIG. 3, the second side 24 of the flange 12 includes an inner flange face 64, the underside detail of the core area 36, the arbor hole 38, the drive hole 40, the handles 42, 44, the radial set of bolt holes 46, the set of inner bolt holes 52, and a plurality of core retaining features 66.

More specifically, the inner flange face 64 is the opposing side of the annulus-shaped body that defines the flange face 32 of FIG. 2. The inner flange face 64 thus extends from the core area 36 to the outer edge of the annulus. The inner flange face 64 is largely flat and smooth, which facilitates winding and unwinding of the load without damaging the load.

The core retaining features 66 are molded protrusions that extend axially outward from the inner flange face 64, and are located along a select one of a plurality of circumferences 70, 71, 72. In this embodiment, each of the core retaining features includes an axially raised feature having a substantially circumferentially oriented outer surface 86, as well as support ribs 88 that extend radially inward from the outer surface 86.

In the configuration of FIG. 1, the core retaining features 66 are located such that their radially outer surfaces 86 are located approximately along the circumference 70. As discussed above, each of the circumferences 70, 71 and 72 has a radius that corresponds to the radius of the core intended to be used with the flange 12. In particular, the circumferences 70, 71 and 72 correspond to the inner diameters of each of three available core sizes. Thus, for example, the circumference 70 is approximately equal to the inner diameter of the hollow core 16, the circumference 72 is approximately equal to the inner diameter of the hollow core 18, and the circumference 71 is approximately equal to the inner diameter of another core, not shown.

In the embodiment described herein, the core retaining features 66 are disposed only at the one of the circumferences 70, 71 and 72 that corresponds to the core being used. However, it will be appreciated that the core retaining features 66 may be configured such that the features may be both on the circumference 70, 71 and 72 corresponding to the core to be used, as well as on any circumference that is radially inward of the select circumference. Thus, if the core 16 of FIG. 1*a* is to be used, then the core retaining features 66 may be located at the each of the circumferences 70, 71, and 72. However, if the core 18 of FIG. 1*b* is to be used, then the core retaining features 66 are only located at the circumference 72. Nevertheless, in the embodiment described herein, the core retaining features 66 are located at only the one circumference 70, 71 or 72 that corresponds to the core to be used.

In accordance with at least some embodiments, the position of the core retaining features 66 is variably configured through the use of various configurations of mold inserts, which will be discussed further below in connection with FIGS. 5 to 7.

Figure 5:
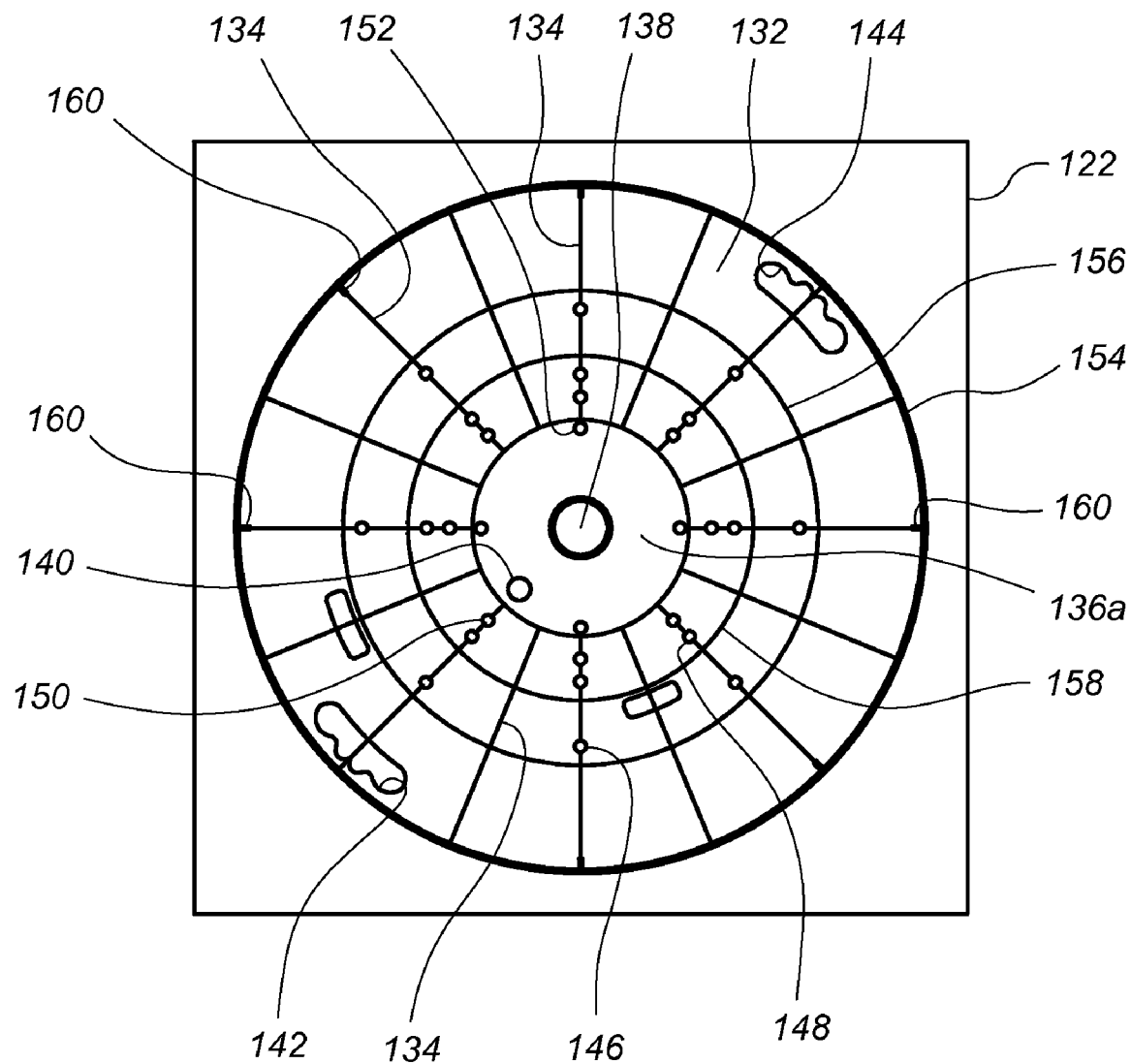
FIG. 5 shows an exemplary embodiment of a first mold element that may be used in the manufacture of the flange of FIG. 2.
Figure 6:
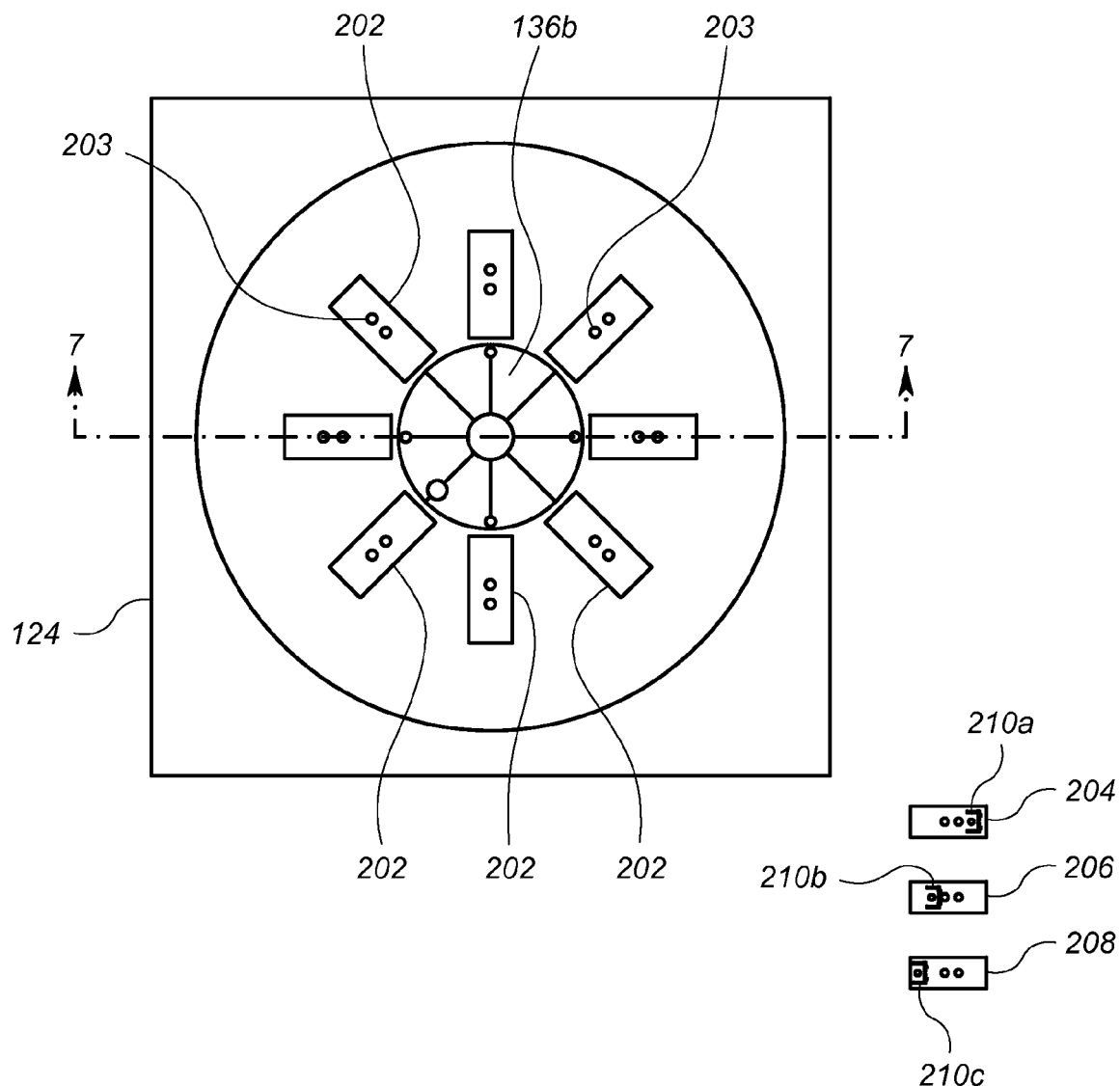
FIG. 6 shows an exemplary embodiment of a second mold element that may be used in the manufacture of the flange of FIG. 2, as well as examples of three different insert elements that may be used with the second mold element.
Figure 7:
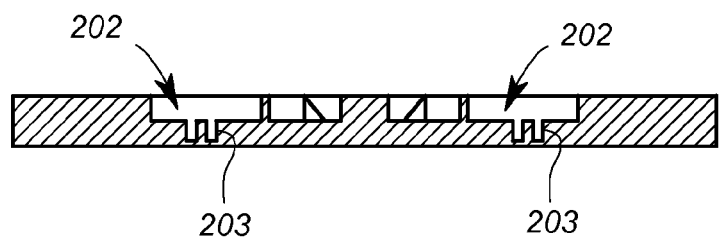
FIG. 7 shows a cross-sectional view of the second mold element of FIG. 6 taken along section VII-VII.

An exemplary mold arrangement according to an embodiment of the invention is shown in FIGS. 5 and 6. The mold arrangement includes a first mold element 122 shown in FIG. 5 and a second, opposing mold element 124 shown in FIG. 6. The first mold element 122 and the second mold element 124 are configured to be disposed against and opposite each other and by a mold press, not shown. When disposed against each other, the first mold element 122 and the second mold element 124 define an intermediate cavity that defines the shape and features of the flange 12, as is known in the art. Molten material such as a plastic material is injected into this mold cavity as is well known in the art.

Referring now to FIG. 5, the first mold element 122 includes features that define the mold negative of most of the first side 22, including a surface 132 that defines a negative of the flange face 32. By "negative", it is meant that the mold element forms an inversion of the surface of a structure such that when molten material is placed in the mold, the mold element creates that structure surface in the finished molded product.

The first mold element 122 also includes a plurality of radially extending notches 134 that define the ribs 34, a negative 136*a* of the first side of the core area 36, an arbor hole post 138 that defines the negative of the arbor hole 38, a drive hole post 140 that defines the negative of the drive hole 40, first and second handle hole posts 143, 145 that define the negatives of the first and second handle holes 42, 44, a set of inner bolt hole posts 152 that defines the negative of the inner bolt holes 52, an outer annular notch 154 that defines the negative of the outer annular rim 54, and inner annular notches 156 and 158 that define the negatives of the inner annular rims 56 and 58. The first mold element 122 also includes post cavities 160 within the rib notches 134 that define the negative of the rim extensions or posts 60 in first side 22 of the flange.

The first mold element 122 further includes three sets of radial set of bolt hole land cavities 146, 148 and 150. The three sets of radial set of bolt hole land cavities 148, 149 and 150 are cavities located in the three possible positions of the bolt holes along circumferences 48, 49 and 50. The cavities 148, 149 and 150 define the lands for all three sets of bolt holes (e.g. bolt hole set 46 of FIG. 2), even though only one set of bolt holes will actually be formed, as discussed below in connection with FIG. 6.

It will be appreciated that since the arbor hole 38, the drive hole 40, the first and second handle holes 42, 44 and the set of inner bolt holes 52 all define voids or through-holes the flange 12, all or some of the arbor hole post 138, the drive hole post 140, the first and second handle hole posts 142, 144 and/or the inner bolt hole posts 152 may be formed as part of the second mold element 124 instead of the first mold element 122.

Referring now to FIG. 6, the second mold element 124 is shown in plan view. FIG. 7 shows the mold element 124 along section VII-VII of FIG. 6. Reference is made to both FIGS. 6 and 7 for discussion of the second mold element 124. The second mold element 124 generally includes a negative of the relatively smooth inner flange face 64, and a feature 136*b* that defines the negative of the underside of the core area 36. The second molded element 124 includes a plurality of cavities 202 configured to receive at least some of a plurality of mold inserts 204, 206 and 208. The plurality of cavities 202 and the mold inserts 204, 206 and 208 may be arranged in a plurality of configurations, each corresponding to one of the possible positions of the core retaining features 66 of the flange 12 (see FIG. 3). To this end, each mold insert 204, 206 and 208 includes a negative 210*a*, 210*b*, 210*c* of the core retaining feature 66 disposed at a different relative position.

In this embodiment, a set of eight substantially identical mold inserts are placed within the cavities 202 for each configuration. Each set of eight substantially identical mold inserts has the shape of one of the inserts 204, 206 and 208. As a consequence, if the flange 12 is to be set up to accommodate a first size core, then eight mold inserts having the design of the insert 204 are placed in to the cavities 202. If the flange 12 is to be set up to accommodate a second size core, then eight mold inserts having the design of the insert 206 are placed in to the cavities 202. If the flange is to be set up to accommodate a third size core, then eight mold inserts having the design of the insert 208 are placed in to the cavities 202. In the embodiment forming the flange 12 shown in FIGS. 2 and 3, the eight mold inserts of the shape of the insert 204 are used.

Figure 8:
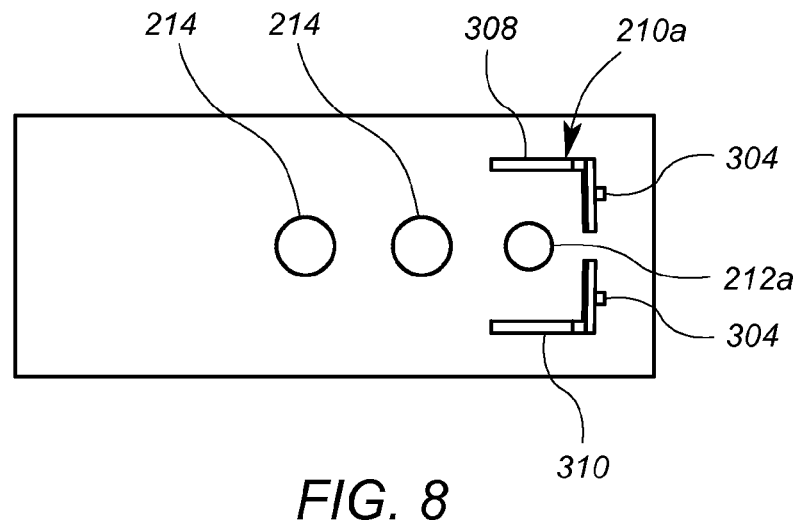
FIGS. 8, 9 and 10 show in further detail a top plan view of mold inserts that may be used in the second mold element of FIG. 6.
Figure 9:
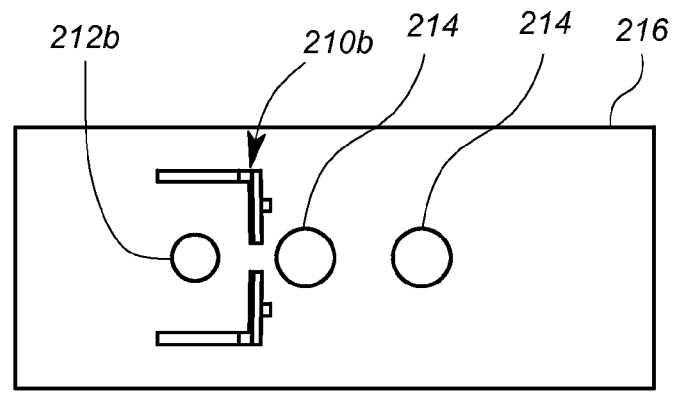
Figure 10:
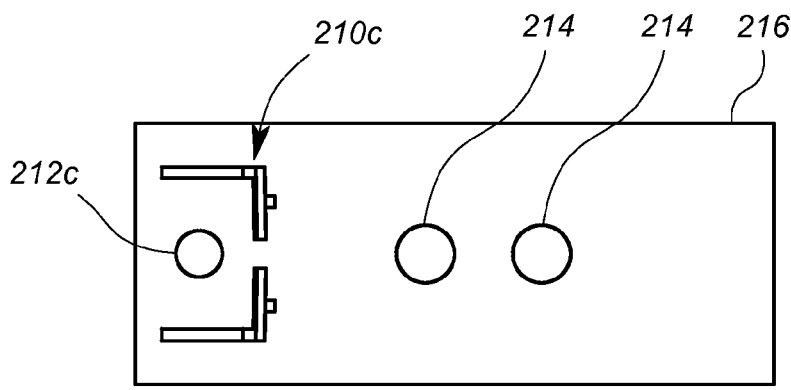

The mold inserts 204, 206 and 208 are shown only in schematic or representative form in FIG. 6. Further detail regarding an exemplary embodiment of the mold inserts 204, 206 and 208 is shown in FIGS. 8, 9 and 10, which will be referred to simultaneously herebelow. Each mold insert 204, 206 and 208 includes a body 216, a respective notch 210, 210*b*, 210*c* that forms a negative of a core retaining feature such as the core retaining feature 66 of FIG. 3, a respective post 212*a*, 212*b*, 212*c* for forming a bolt through-hole (e.g. through-hole 46 of FIGS. 2 and 3), and bolt holes 214.

The bodies 216 of the mold inserts 204, 206 and 208 are substantially identical in length, width and depth such that they are interchangeably arrangable in the cavities 202. The notches 210*a*, 210*b* and 210*c* are arranged at different positions on the body 216 of the respective mold inserts 204, 206 and 208 such that when the respective mold insert 204, 206, 208 is disposed within the cavity, the notches have an outermost radial surface (e.g. the negative of surface 86) that is substantially aligned with one of the circumferences 70, 71 and 72 (see FIG. 3). Each of the bolt posts 212*a*, 212*b*, and 212*c* are positioned on their body 216 such that they are radially inward of the outermost radial surface of their respective notch 210*a*, 210*b*, 210*c*. The bolt posts 212*a*, 212*b* and 212*c* are configured to align along the respective circumferences 48, 49 and 50 (see FIG. 2) when the blocks 216 are disposed within the cavities 202.

Each notch 210*a*, 210*b* and 210*c* in this embodiment is configured to define a feature (e.g. core retaining feature 66) that supports and contacts the inner diameter of a correspondingly sized reel core. As discussed above, each core retaining feature 66 may suitably include a first surface 86 that is generally aligned along one of the circumferences 70, 71 or 72, and inwardly extending inclined support ribs 88 to provide strengthening to the surface 86.

The negative (i.e. mold structure) of the exemplary core retaining feature 66 of this embodiment is shown in further detail in FIG. 8. A first notch 302 defines the first surface 86 of the core engaging feature 66 that is configured to be aligned with the core. The notch 302 includes protrusion notches 304 that form radially-outward extending protrusions on the first surface 86, not shown in FIG. 3. The radially extending protrusions on the first surface 86 are configured to stress, deform or partly penetrate the inner diameter of the core. This stress, deformation and/or partial penetration of the core advantageously discourages rotation of the core on the flanges once the reel is assembled. A discussion of this advantage is provided in U.S. Pat. No. 5,897,075, which is incorporated herein by reference. The negative of the core retaining feature also includes support rib notches 308 and 310, which form the supports 88 that strengthen the first surface 86 (formed by notch 302) against radially inward stress. In this embodiment, the support rib notches 308 and 310 are formed at the ends of the notch 302.

It will be appreciated that the core retaining features may take many forms, and need not have the particular structure dictated by the notches 302, 304, 308 and 310. However, additional advantages are provided by this embodiment. For example, placement of the support rib 88 at the ends of the first surface 86 provides an advantage of forming a U or C-shaped structure that defines an open space for placement of the corresponding bolt through-hole (e.g. through-hole 46 of FIGS. 2 and 3) in a relatively outward position. In any event, regardless of the detailed structure of the core engaging feature 66, each notch 210*a*, 210*b*, 210*c* is formed as the negative of the feature 66.

The bolt holes 214 are aligned with corresponding bolt holes 203 located within the cavities 202 (see FIG. 6). The bolt holes 214 are configured to receive a bolt or fastener, not shown, that removably fastens the inserts 204, 206 and 208 to the second mold element 124 within the cavities 202.

In use, the mold elements 122, 124 are configured for making flanges of a particular known core size. To this end, eight inserts having the configuration of a select one of insert 204, 206 or 208 are secured into the cavities 202 via fasteners/bolts, not shown. In this example, it is assumed that eight mold inserts having the shape of the mold insert 204 are used to generate the flange 12, which is designed for use with the core 16 of FIG. 1.

So configured, the first mold element 122 and the second mold element 124 are then used for injection molding using ordinary methods. For example, the mold elements 122 and 124 are compressed together within a mold press using any suitable technique. When compressed together, the mold elements 122, 124 form a mold cavity having the negative shape of the flange 12. Molten material such as plastic is then injected into the mold cavity using any suitable methods.

After set-up and cure, the mold elements 122, 124 are released and the substantially finished flange is ejected from the mold. Molding using opposing mold elements is well-known.

A reel such as the reel 10 of FIG. 1*a* may then be assembled using two flanges having the shape of the flanges 12. A core (e.g. core 16) having the size suited for the location of the core retaining features 66 is placed between the two flanges 12 such that each end of the core 16 fits over and engages the core retaining features 66. The flanges 12 are then preferably bolted to each other (with the core 16 in between) using long bolts and the through-holes 46.

It is noted that the mold comprising the mold elements 122 and 124 configured as described above may be reconfigured to produce flanges to be used with a differently sized core, such as the flanges 14 or 15 of FIG. 1*b*. To this end, the removable inserts 204 are removed from the second mold element 124 and replaced with the removable inserts 208. Once the removable inserts 208 are secured (via bolts or the like) within the cavities 202 of the second mold element 124, the injection molding operation is repeated. In this case, the finished flange 14 (or 15) has core retaining features 66 that are in a different position, due to the different design of the mold insert 208.

It will therefore be appreciated that the mold element 124 may be configured to generate flanges configured for use with cores of different shape using different combinations of mold inserts. This allows a single mold tool (elements 122 and 124) to be used where multiple mold tools may have been required in the past.

It will be appreciated that the mold inserts and mold element may be configured in a number of alternative ways to achieve at least some of the advantages of the above described embodiment. For example, instead of a single set of cavities 202 arranged in an annular fashion, the second mold element may include a different set of cavities corresponding to each different circumference or core size. For example, there may be a set of cavities at about each of the circumferences 70, 71 and 72 of FIG. 3. The mold inserts in this case may include one set of inserts defining a core engaging surface, and remaining sets of inserts defining relatively flat surfaces. The set of inserts defining the core engaging features may be placed in the set of cavities at the circumference 70, 71 or 72 corresponding to the core to be used, while the flat inserts are placed in the other sets of cavities.

It will also be appreciated that the core engaging features 66 may take other forms, such as a post, a set of posts, or other structures. Such structures preferably include anti-rotation features of some kind, but it will be appreciated that many advantages of the present invention may be achieved without including protrusions (e.g. those formed by notches 304) that inhibit rotation of the core.

It will further be appreciated that the handles 42, 44 are placed and shaped for ergonomic comfort. However, advantages of the invention may be obtained in the absence of handles, or with handles lacking some or all of the ergonomic features of the handles 42, 44. Conversely, the advantages of the handles 42, 44 may be obtained without employing a configurable mold element having replaceable inserts.

In addition, while the exemplary embodiment shows tool elements that may be configured for three different sizes of cores, it will be appreciated that the invention may readily be adapted for two, four or other amounts of different sizes of cores.

Thus, it will be appreciated that the above described embodiments are merely exemplary, and that those of ordinary skill in the art may readily devise their own implementations and modifications that incorporate the principles of the present invention and fall within the spirit and scope thereof.

We claim:

1. A method of molding a flange using a first tool element and a second opposing tool element, the first tool element defining a negative of at least a portion of a first side of a flange, and the second tool element defining a negative of at least a portion of the second side of the flange, the method comprising:
   a) providing a set of blocks for insertion into a plurality of recesses in the second tool element, the set of blocks insertable in a plurality of configurations, each configuration defining a negative of a set of retention features on the second side of the flange, the plurality of configurations defining differing configurations of retention features on the second side, each retention feature configured to support and contact a reel core; and
   b) inserting at least some of the set of blocks into the second tool element to form a selected one of the plurality of configurations; and
   c) performing injection molding using the first tool element and the second tool element.

2. The method according to claim 1, wherein the differing configurations of retention features comprise annular configurations of retention features, each annular configuration located at a different radius from a central axis of the flange.

3. The method according to claim 1, wherein step a) further comprises providing a plurality of subsets of blocks, each subset of blocks corresponding to one of the plurality of configurations, and step b) further comprises inserting one of the subsets of blocks into the plurality of recesses.

4. The method of claim 1, wherein step b) further comprises securing the at least some blocks into the second tool element using fasteners.

5. The method of claim 1, further comprising:
   d) inserting blocks into the second tool element to form a different selected one of the plurality of configurations; and
   e) performing injection molding using the first tool element and the second tool element.

6. The method of claim 5, wherein each of the set of blocks includes a body portion and a retention feature negative, and wherein the body portions of all of the set of blocks have substantially identical dimensions.

7. The method of claim 6, wherein at least two of the set of blocks have retention features negatives disposed at different locations within their respective body portions.

8. The method of claim 5 further comprising, prior to step d), removing blocks from the second tool element.

9. A method of molding a flange, comprising:
   a) inserting at least some of a set of blocks into a second tool element to form a selected one of a plurality of configurations, wherein the set of blocks are insertable in the plurality of configurations, each configuration defining a negative of a set of retention features on a second side of a flange, the plurality of configurations defining differing configurations of retention features on the second side, each retention feature configured to support and contact a reel core; and
   b) performing injection molding using a first tool element and the second tool element, the first tool element having a surface defining a negative of at least a portion of a first side of the flange, and the second tool element having a surface defining a negative of at least a portion of the second side of the flange.

10. The method of claim 9, wherein the surface of the second tool element and the at least some blocks define different portions of the second side of the flange.

11. The method according to claim 9, wherein the differing configurations of retention features comprise annular configurations of retention features, each annular configuration located at a different radius from a central axis of the flange.

12. The method of claim 9, wherein step a) further comprises securing the at least some blocks into the second tool element using fasteners.

13. The method of claim 9, further comprising:
   c) inserting blocks into the second tool element to form a different selected one of the plurality of configurations; and
   d) performing injection molding using the first tool element and the second tool element.

14. The method of claim 13, wherein each of the set of blocks includes a body portion and a retention feature negative, and wherein the body portions of all of the set of blocks have substantially identical dimensions.

15. The method of claim 13, wherein at least two of the set of blocks have retention features negatives disposed at different locations within their respective body portions.

16. The method of claim 13 further comprising, prior to step d), removing blocks from the second tool element.

17. A method of molding a flange using a first tool element and a second opposing tool element, the first tool element defining a negative of at least a portion of a first side of a flange, and the second tool element defining a negative of at least a portion of the second side of the flange, the method comprising:
   a) obtaining a set of blocks for insertion into a plurality of recesses in the second tool element, the set of blocks insertable in a plurality of configurations, each configuration defining a negative of a set of retention features on the second side of the flange, the plurality of configurations defining differing configurations of retention features on the second side, each retention feature configured to support and contact a reel core; and
   b) inserting at least some of the set of blocks into the second tool element to form a selected one of the plurality of configurations; and
   c) performing injection molding using the first tool element and the second tool element.

* * * * *